United States Patent
Jegelka et al.

(10) Patent No.: US 6,887,939 B2
(45) Date of Patent: May 3, 2005

(54) STABILIZING AGENT

(75) Inventors: Udo Jegelka, Recklinghausen (DE); Jochen Kirchhoff, Luedinghausen (DE); Thomas Hjertberg, Goeteborg (SE); Bill Gustafsson, Stenungsund (SE); Johan Linner, Goeteborg (SE); Annika Smedberg, Stenungsund (SE)

(73) Assignees: Degussa AG, Duesseldorf (DE); Borealis A/S, Lyngby (DK)

( * ) Notice: Subject to any disclaimer, the term of this patent is extended or adjusted under 35 U.S.C. 154(b) by 37 days.

(21) Appl. No.: 10/335,931

(22) Filed: Jan. 3, 2003

(65) Prior Publication Data
US 2003/0125428 A1 Jul. 3, 2003

Related U.S. Application Data

(63) Continuation of application No. 09/806,495, filed as application No. PCT/EP99/07695 on Oct. 13, 1999, now abandoned.

(30) Foreign Application Priority Data

Oct. 15, 1998 (SE) ................................. 9803511

(51) Int. Cl.[7] ........................... C08L 75/04; C08L 39/04
(52) U.S. Cl. ...................................... 525/185; 525/203
(58) Field of Search ............................ 525/185, 203; 524/99

(56) References Cited

U.S. PATENT DOCUMENTS

| | | | |
|---|---|---|---|
| 4,294,949 A | * 10/1981 | Karrer | ............... 526/262 |
| 4,413,096 A | * 11/1983 | Fu et al. | ............... 524/204 |
| 4,506,102 A | 3/1985 | Kaufhold et al. | |
| 4,785,100 A | 11/1988 | Kaufhold | |
| 5,391,750 A | 2/1995 | Thelen et al. | |
| 5,416,215 A | 5/1995 | Bueschken et al. | |
| 5,693,817 A | 12/1997 | Frentzen et al. | |
| 5,728,836 A | 3/1998 | Kaufhold | |
| 5,773,622 A | 6/1998 | Jegelka et al. | |
| 5,888,356 A | 3/1999 | Keil et al. | |
| 5,902,895 A | 5/1999 | Kaufhold | |
| 5,945,536 A | 8/1999 | Jegelka et al. | |
| 6,077,956 A | 6/2000 | Kaufhold et al. | |
| 6,452,016 B1 | 9/2002 | Kaufhold | |

* cited by examiner

*Primary Examiner*—Kriellion A. Sanders
(74) *Attorney, Agent, or Firm*—Oblon, Spivak, McClelland, Maier & Neustadt, P.C.

(57) ABSTRACT

The present invention relates to a stabilizing agent for polymers or copolymers which is a copolymer of ethylene or propylene (A) and a vinyl compound (B) having the formula:

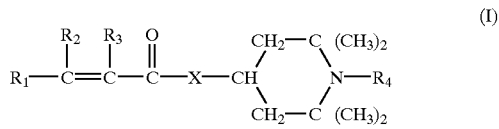

Figure 1:
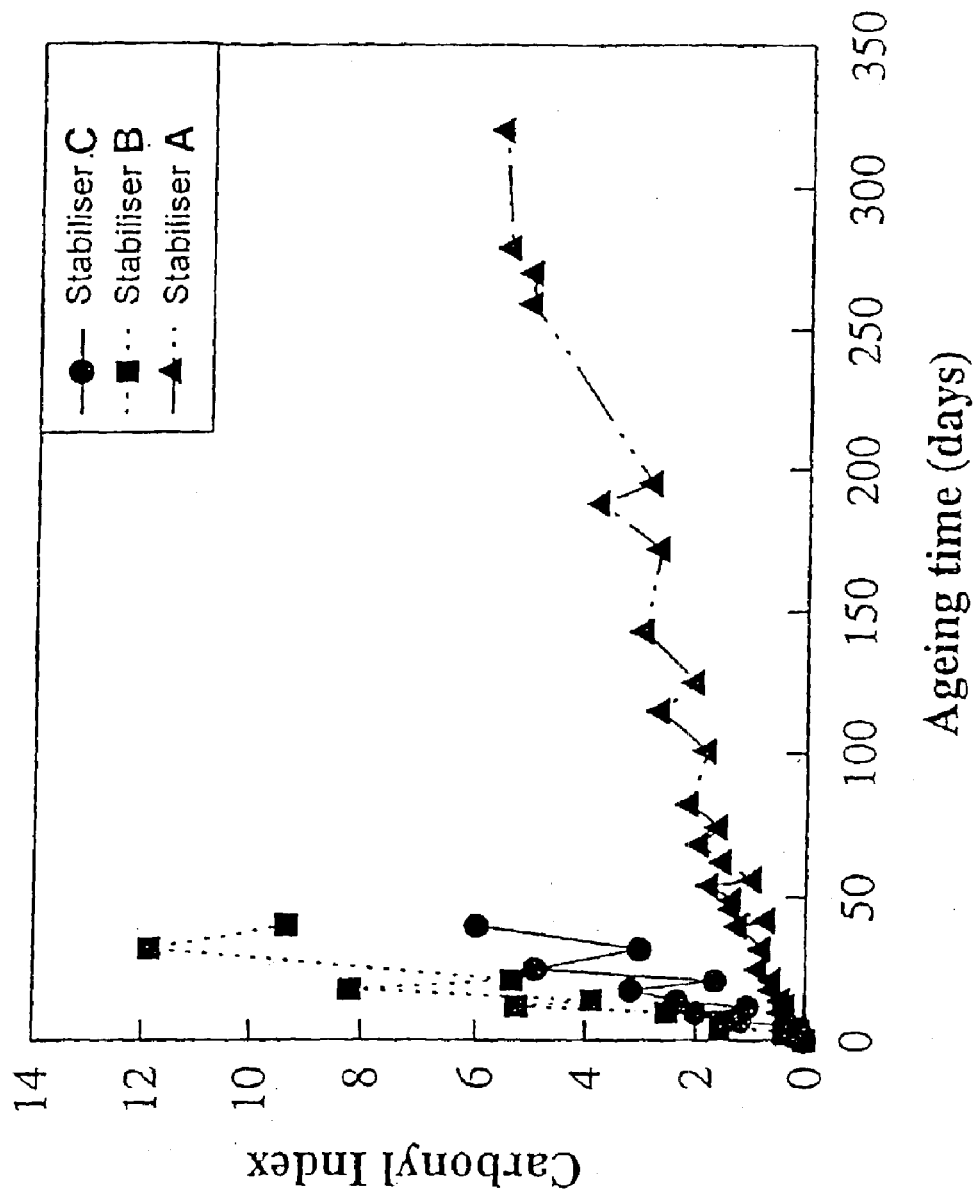

wherein X is O, NH or $NR_5$; $R_1$, $R_2$ and $R_3$ are each independently H, $C_1$–$C_8$ alkyl, $C_1$–$C_8$ substituted aryl; $R_4$ is H, $C_1$–$C_8$ alkyl, $C_6$–$C_{12}$ cycloalkyl, $C_1$–$C_{10}$ acyl, $C_1$–$C_{10}$ acyloxy or $C_1$–$C_8$ alkyl ether; $R_5$ is $C_1$–$C_8$ alkyl and wherein the copolymer has at least 1 mol % (B) and has an $MFR_2$ of 1–1000 g/10 min.

16 Claims, 4 Drawing Sheets

STABILIZING AGENT

This application is a Continuation of application Ser. No. 09/806,495, filed on May 31, 2001, now abandoned, which was filed as Internation Application No. PCT/EP99/07695, filed Oct. 13, 1999.

FIELD OF THE INVENTION

The present invention relates to a stabilizing agent for polymer materials and to a polymer material containing the stabilizing agent.

BACKGROUND OF THE INVENTION

Polymer materials, e.g. polyolefin materials such as ethylene polymers generally have rather poor resistance to the influence of different environmental conditions such as light, heat and weather.

To improve the physical properties of polymer materials and to increase their resistance to the influence of environmental conditions, various stabilizing additives are usually added in a total amount of about 0.05–5% by weight, preferably about 0.1–4% by weight. These additives include antioxidants such as sterically hindered phenols, aromatic amines, organic phosphites, and thio compounds; and light stabilizers such as hindered amine light stabilizers (HALS). Usually a "cocktail" of at least two different stabilizing agents, e.g. a HALS compound and a hindered phenol compound is added to the polymer material. However, known stabilizing additives often have an insufficient stabilizing effect or become unsatisfactory due to bleeding of the additive from the polyolefin material. A stabilizing additive that effectively protects polymer materials against the influence of environmental conditions and which is not prone to bleeding from the polymer material would therefore be desirable.

One such stabilizing additive is disclosed in EP-A-0 468 418 and consists of a copolymer of ethylene (A) and a vinyl compound (B) represented by the general formula:

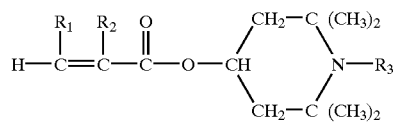

wherein $R_1$ and $R_2$ are each an independent hydrogen atom or a methyl group, $R_3$ is a hydrogen atom or an alkyl group of 1–4 carbon atoms; a ratio of (B) to the sum of (A) and (B) is less than 1 mol %; a proportion of the amount of vinyl compounds (B), which are not successively bonded to like units (B) in the chain, but bonded to unlike units (A) on both sides thereof, to the total amount of (B) units in the copolymer is at least 83%; and an MFR of the copolymer ranges from 0.1 to 200 g/10 min.

In EP-A-0 468 418 it is submitted that decreased light stability of hindered amine copolymer additives is caused by the block structure comprising at least two vinyl moieties successively bonded having hindered amines in the side chain or unreacted residual ester groups. The most important feature of EP-A-0 468 418 is therefore said to be that the proportion of the amount of vinyl compounds (B) which are not successively bonded at all to like units (B) in the chain to the total amount of (B) is at least 83%. Consequently, the ratio of the vinyl compound (B) to the sum of ethylene (A) and the vinyl compounds (B) is less than 1 mol %.

SUMMARY OF THE INVENTION

It has now been surprisingly discovered that, contrary to the teachings of EP-A-0 468 418 it is possible to obtain an effective stabilizing agent of a copolymer of ethylene or propylene (A) and a vinyl compound (B) with the formula (I) below where the ratio of the vinyl compound (B) to the sum of ethylene or propylene (A) and the vinyl compound (B) is at least 1 mol %. This stabilizing copolymer additive can be used as a master batch to stabilize polymer materials, particularly polyolefin materials such as ethylene polymers against the influence of oxygen, light and heat.

More particularly, the present invention provides a stabilizing agent for polymers, characterised in that it comprises a copolymer of ethylene or propylene (A) and a vinyl compound (B) with the formula (I):

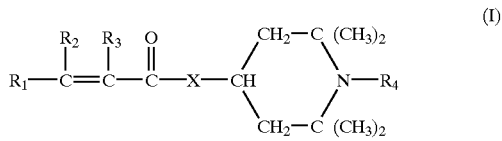

wherein X=O, NH or $NR_5$, $R_1$, $R_2$ and $R_3$ independently each=H, $C_1$–$C_8$ alkyl $C_1$–$C_8$ alkenyl or $C_1$–$C_8$ substituted aryl; $R_4$=H $C_1$–$C_8$ alkyl, $C_6$–$C_{12}$ cycloalkyl, $C_1$–$C_{10}$ acyl, $C_1$–$C_{10}$ acyloxy or $C_1$–$C_8$ alkyl ether; $R_5$=$C_1$–$C_8$ alkyl; the copolymer contains at least 1 mol % of (B); and the copolymer has an $MFR_2$ of 1–1000 µl 0 min.

The present invention also provides a polymer material comprising the stabilizing agent defined above as a combined light and heat stabilizing agent.

Other distinguishing features and advantages of the invention will appear from the following specification and the appended claims.

DETAILED DESCRIPTION OF THE INVENTION

In the stabilizing agent of the present invention preferred vinyl monomer compounds (B) of formula (I) are those where X=O; $R_1$ and $R_2$ are H; $R_3$ is H or $CH_3$; and $R_4$ is H, $C_1$–$C_5$ alkyl, preferably methyl, or $C_1$–$C_9$ acyl, preferably acetyl or acetoxyl. The most preferred vinyl monomer compound ( ) at present is 2,2,6,6-tetramethyl-4-piperidinyl methacrylate, i.e. $R_1$ and $R_2$ are H and $R_4$ is H or $C_1$–$C_4$ alkyl and $R_3$ is $CH_3$ in formula (I).

As stated above, a characterising feature of the present invention is that the copolymer stabilizing agent includes the comonomer (B) in an amount of at least 1 mol %, preferably at least 1.2 mol %, and more preferably at least 1.5 mol %. The upper limit of the amount of comonomer (B) is preferably 4 mol %, and it is particularly preferred that the amount of (B) is 1.5–4 moil. This means that compared to EP-A-0 468 418 the amount of the comonomer (B) is higher and that many of the comonomer units (B) will be bonded to other comonomer units (B). This is contrary to the teachings of EP-A-0 468 418, which stresses that at least 83% of the comonomer units (B) must be bonded to unlike units (A). Actually, at the present invention it appears that within the above defined ranges for the comonomer (B) a better stabilizing effect is obtained on the polyolefin material the higher the content of the comonomer (B) of the stabilizing agent. This is quite surprising in the light of the teachings of EP-A-0 468 418.

The "melt flow rate" (MFR) of the copolymer stabilizing agent of the invention is determined in accordance with ISO 1133 and is equivalent to the term, "melt index" earlier used. The melt flow rate is determined at a loading of 2.16 kg ($MFR_2$). The $MFR_2$ of the copolymer stabilizing agent of the invention lies in the range of 1 to 1000 g/10 min, preferably 10–400 g/10 min.

The monomer (B) of formula (I) can be prepared by known methods such as disclosed in EP-A-0 468 418.

Similarly, the copolymer stabilizing agent of the present invention can be prepared by known methods such as copolymerisation, e.g. as disclosed in EP-A-0 468 418.

As mentioned earlier, a particular aspect of the present invention is a polymer material incorporating the above defined stabilizing agent. Generally and in connection with the present invention, the expression "polymer material" refers to macromolecular or high molecular weight materials of natural or, preferably synthetic origin. As examples of such polymer materials may be mentioned polyolefins, particularly α-olefin polymers and especially ethylene and propylene polymers; polyacrylate polymers such as polymethyl(meth)acrylate polymers; polyester polymers such as polyethyleneterephthalate polymers; polyamide polymers such as Polyamide 6 and Polyamide 6/6; polyurethanes; halogen containing polymers such as polyvinyl chloride and polyvinylidene chloride; aromatic polymers such as polystyrene; polycarbonate polymers; etc. For a more exhaustive list of suitable polymer materials reference is made to the above mentioned EP-A-0 468 418.

Particularly preferred polymer materials to be stabilized by the incorporation of the above defined stabilizing copolymer are polyolefins such as $C_1$–$C_8$ olefin polymers, preferably ethylene or propylene polymers, most preferably ethylene polymers. The polymer may be a homopolymer of the olefin or a copolymer of the olefin with one or more comonomers which are copolymerisable with the olefin. In the copolymer the olefin should constitute the major part of the mass. The term "copolymer" is intended to include graft copolymers. Ethylene polymers, including ethylene homopolymers and ethylene copolymers, are particularly preferred polyolefin materials to be stabilized with the stabilizing copolymer of the present invention. Copolymers of ethylene may include up to about 50% by weight, preferably about 1–35% by weight of one or more comonomers which are copolymerisable with ethylene. Such comonomers are well known to those skilled in the art and no extensive enumeration will be required, but as examples, mention can be made of vinylically unsaturated monomers, such as $C_3$–$C_8$ α-olefins, for instance propene, butene; vinylically unsaturated monomers containing functional groups, such as hydroxyl groups, alkoxy groups, carbonyl groups, carboxyl groups and ester groups. Such comonomers may consist of e.g. (meth)acrylic acid and alkyl esters thereof, such as methyl-, ethyl-, and butyl(meth)acrylate; vinylically unsaturated, hydrolysable silane compounds, such as vinyl trimethoxy silane; vinyl acetate, etc.

Low density polyethylene (LDPE), i.e. polyethylene prepared by radical polymerisation at a high pressure is a preferred ethylene polymer at present.

The stabilizing agent should be incorporated homogeneously into the polymer material and this is preferably done by compounding the polymer material and the stabilizing agent in the form of a master batch. The stabilizing agent master batch may consist of the copolymer stabilizing agent only or it may comprise the copolymer stabilizing agent together with another master batch polymer such as polyethylene. The master batch may also include other additives, including other stabilizing agents to be incorporated into the polyolefin material. However, the stabilizing agent of the present invention provides combined light and heat/oxidation stabilization. This means that the stabilizing agent of the present invention may be used as a UV stabilizer as well as an antioxidant. It is thus possible for the stabilizing agent of the present invention to replace the stabilization "cocktails" generally used so far. This implies advantages with regard to costs as well as environmental aspects and human health.

The amount of the stabilizing agent in the master batch is not critical, but in order to conveniently give the amounts of stabilizing agent in the polymer material defined below, the master batch usually comprises the stabilizing agent in an amount such as to give 2–25% by weight of comonomer units (B) in the master batch.

With regard to the amount of the copolymer stabilizing agent added to a polymer material, such as an ethylene polymer, this is dependent on the content of the comonomer (B) in the stabilizing agent. Thus, decisive for the amount of copolymer stabilizing agent added is the overall amount of comonomer (B) and not the amount of the copolymer stabilizing agent as such. Generally, it is preferred to incorporate the copolymer stabilizing agent in such an amount that the comonomer (B) comprises 0.01–0.80% by weight, more preferably 0.05–0.60% by weight of the polymer material.

Although the stabilizing agent of the present invention may be used as a stabilizing agent for various polymer materials as defined above, it is particularly useful as a stabilizing agent for ethylene polymers and propylene polymers. The stabilizing agent is preferably used as a stabilizing agent for ethylene polymers, and particularly good results have been obtained when stabilizing low density polyethylene (LDPE) as well as high density polyethylene (HDPE).

Having explained the present invention above, it will now be further illustrated by way of some non-limiting examples.

EXAMPLE 1

This example illustrates the enhanced resistance against thermo-oxidative degradation provided by the stabilizing agent of the present invention.

The base resin used for the degradation tests was an LDPE polymer with a melt flow rate ($MFR_2$) of 2 g/10 min, determined according to ISO 1133, and a density of 0.920 g/cm$^3$.

Three stabilizing agents were tested, one stabilizing agent A according to the present invention, and two reference stabilizing agents B and C, respectively.

The stabilizing agent A according to the present invention was a copolymer of ethylene and a vinyl compound of formula (I) with X=O; $R_1=R_2=R_4$=H; and $R_3$=CH$_3$. The stabilizing agent A contained about 1.4 mole % of the vinyl compound of formula (I) as determined by NMR (6.3 vinyl compound units/1000 carbon atoms). The $MFR_2$ of stabilizing agent A was about 200 g/10 ml.

The reference stabilizing agent B was a copolymer similar to that of stabilizing agent A, except that it contained only about 0.5 mole % (2.3 vinyl compound units/1000 carbon atoms) of the vinyl compound of formula (I). The $MFR_2$ of stabilizing agent B was also about 200 g/10 min.

The reference stabilizing agent C was a well-known oligomeric HALS stabilizing agent available under the trade name Chimassorb 944 from Ciba-Geigy.

The amount of stabilizing agent added to the base resin was such that the same molar concentration of stabilizing groups were obtained in the base polymer in each case.

The test samples were prepared by blending the two components (base resin and stabilizing agent) in a Brabender Plasticorder operating at 140° C. and 40 rpm. When preparing test samples of stabilizing agent C a master batch was first prepared containing 1.2% by weight of stabilizing agent C, and then the master batch was diluted with more base resin to a concentration of 0.06% by weight stabilizing agent C. The same procedure was used for stabilizing agents A and B, although the concentration in % by weight was adjusted to obtain the same concentration in mole % of stabilizing groups for all three test samples.

The test samples were then pressed in a hot press at 125° C. to thin films with a thickness of 0.1–0.2 mm for ageing tests. The ageing was performed at 90° C. in a cellular oven, Elastocon EB01. An air flow of 0.8 liters/min was used for the ageing tests.

The ageing was monitored by FT-IR and SEC (Size Exclusion Chromatography) measurements. The FT-IR measurements were made on a Perkin-Elmer FT-IR 2000 for determining the thermo-oxidative degradation in terms of carbonyl index (CI). The carbonyl index is the peak height of the absorption at 1717 cm$^{-1}$ divided by the peak height of an internal reference at 2019 cm$^{-1}$. The SEC measurements were made on a Waters 150 CV type apparatus operating at 135° C. and using trichlorobenzene as the mobile phase. The equipment was calibrated with narrow polystyrene standards and linear polyethylene samples according to the principle of universal calibration. The weight average molar mass (Mw) values obtained have not been corrected for long chain branches.

Figure 2:
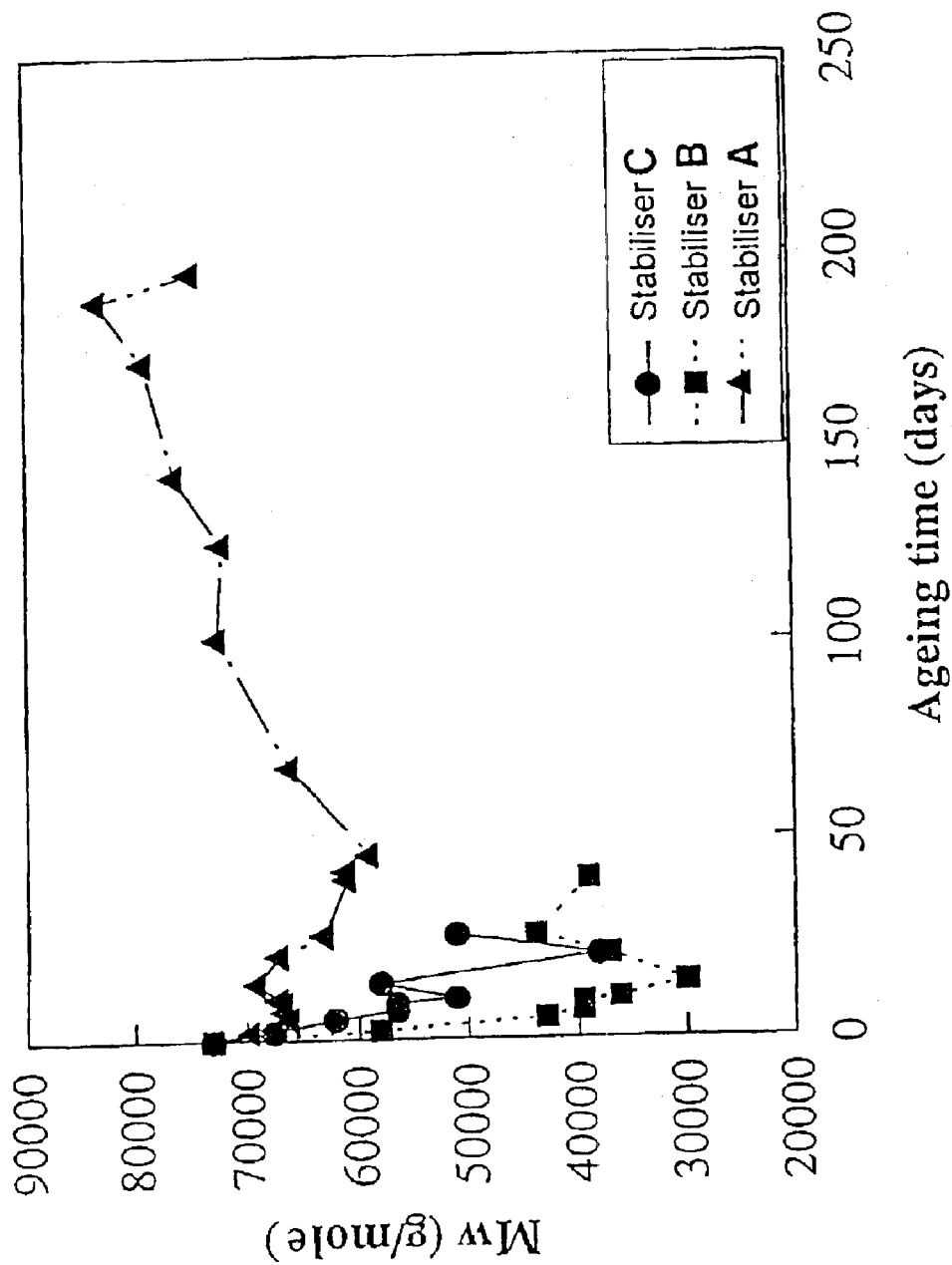

The results of the FT-IR measurements are shown in FIG. 1 and the results of the SEC measurements are shown in FIG. 2.

As is evident from both FIG. 1 and FIG. 2, stabilizing agent A according to the present invention with the highest amount of HALS comonomer has an outstanding performance compared both to stabilizing agent B and stabilizing agent C.

EXAMPLE 2

This example illustrates the enhanced resistance against degradation caused by ultraviolet radiation (UV degradation) provided by the stabilizing agent of the present invention.

Three different stabilizing agents were tested: (i) stabilizing agent I according to the present invention which corresponded to stabilizing agent A in Example 1; (ii) stabilizing agent II (reference) which corresponded to stabilizing agent C in Example 1; and (iii) stabilizing agent III (reference) which was a low molecular weight HALS stabilizing agent known to provide good stability against UV degradation and commercially available under the trade name Tinuvin 770 from Ciba-Geigy.

The samples for the UV degradation test were prepared in the same way as described in Example 1. The UV degradation tests were performed at 65° C. on an Atlas Wheatherometer equipped with a Xenon lamp operating in the wavelength interval of 290–400 nm under 50% relative humidity. The temperature given is the one a black body would have when placed in the test chamber and not the actual temperature of the tested specimens. The tests were performed according to ISO 4892-2.

The UV degradation was monitored by carbonyl index (CI) and molar mass (Mw) measurements.

For the UV degradation tests the CI values are based on the peak at about 1712 cm$^{-1}$ divided by the internal reference at 2019 cm$^{-1}$. The molar mass (Mw) was determined in the same way as described in Example 1. The results are shown in FIG. 3 and FIG. 4.

Figure 3:
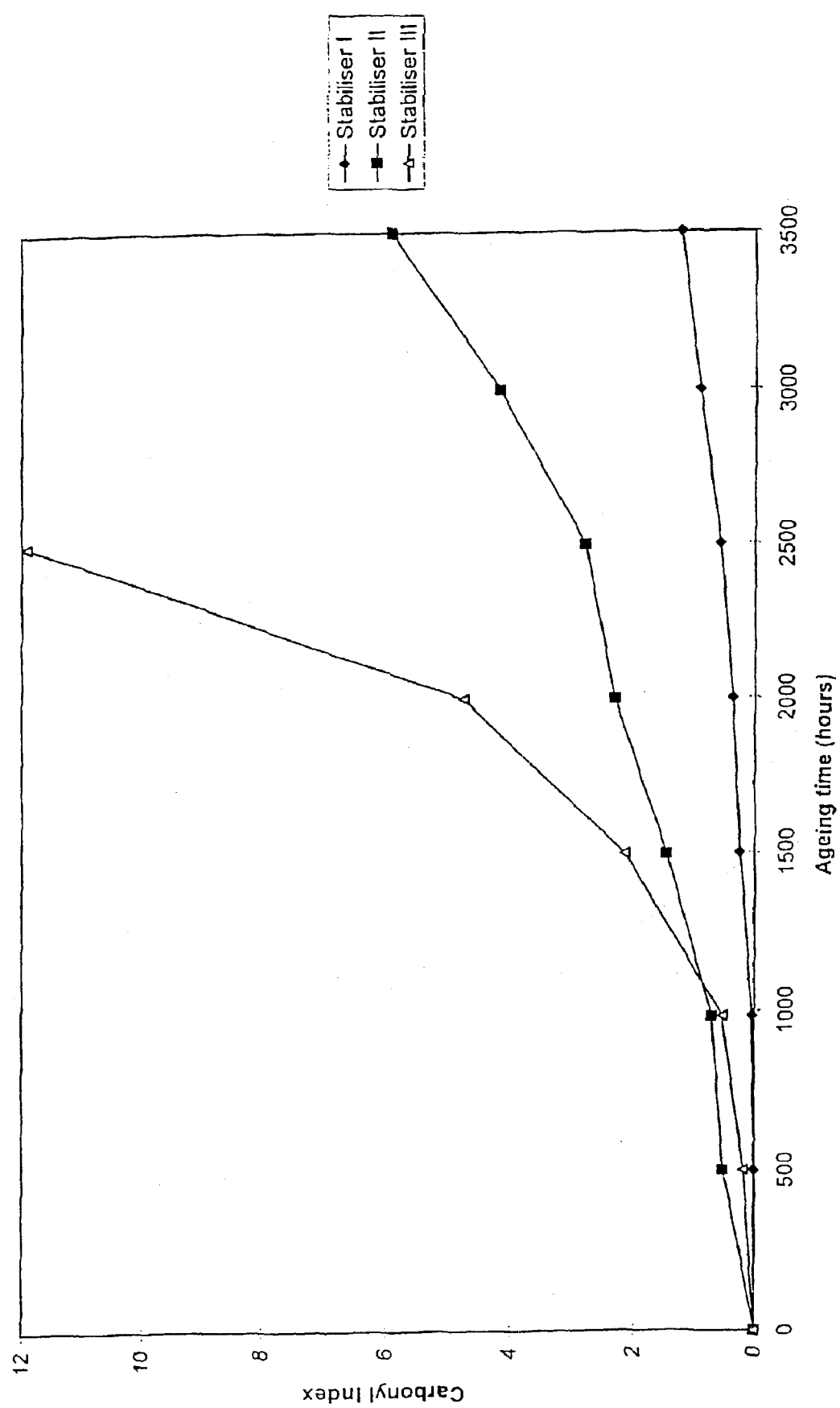
Figure 4:
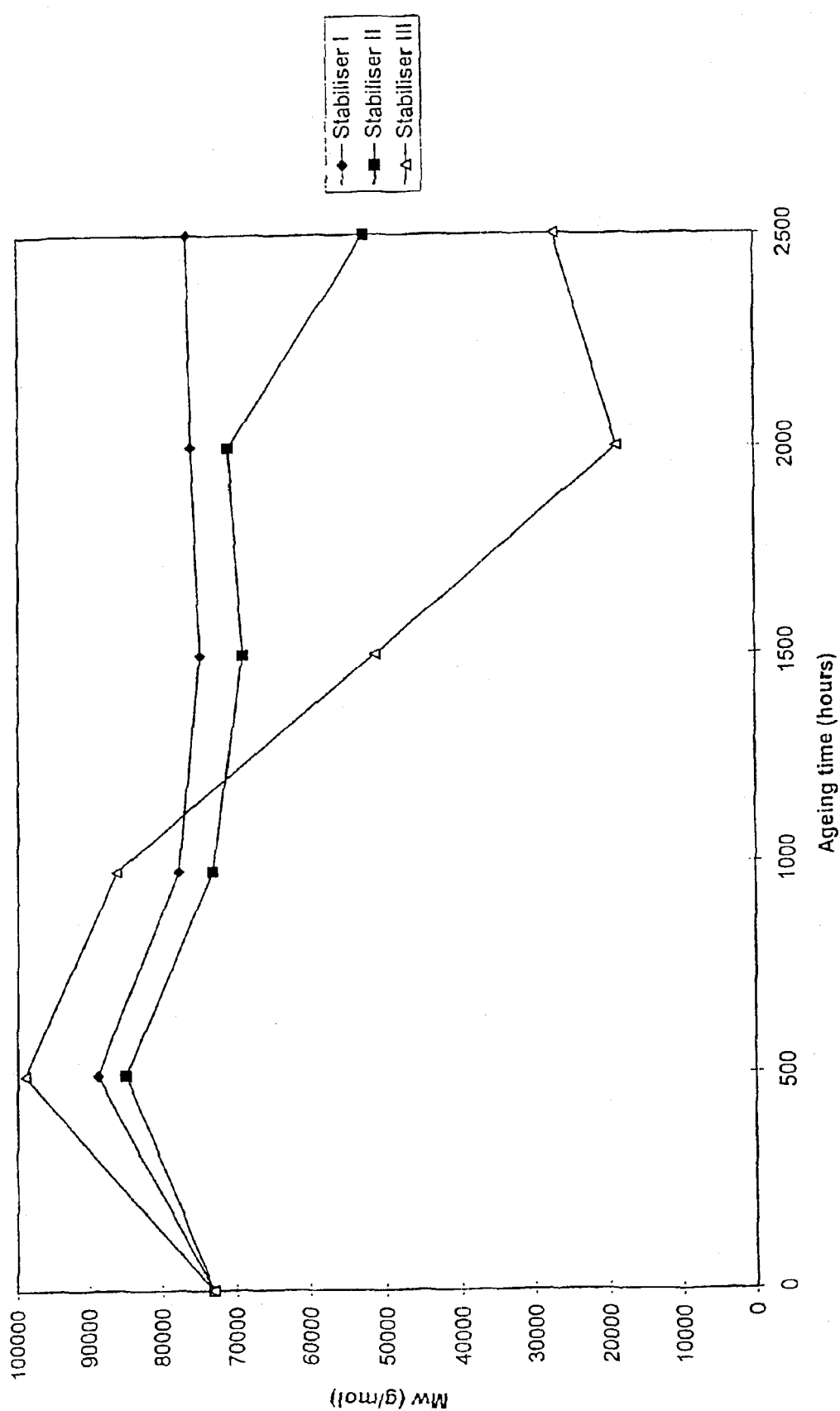

As is evident from FIG. 3, the samples stabilized with stabilizing agent III (Tinuvin 770) reached a very high CI value and showed a substantial decrease in Mw after 2500 hrs of ageing, i.e. the stabilizing effect of stabilizing agent III against UV degradation was poor. The same effect also applies for stabilizing agent II (Chimassorb 944), although to a lesser extent. Stabilizing agent I according to the present invention, however, shows excellent performance with regard to stabilization against UV degradation.

The results of Examples 1 and 2 show that the stabilizing agent according to the present invention is an excellent combined light and heat stabilizing agent.

Having thus described and exemplified the invention with reference to preferred embodiments, it is obvious to the skilled person that it is possible to modify the invention within the scope of the invention as defined by the appended claims.

What is claimed is:

1. A stabilized polymer material, comprising:
   (1) a polymer material, and
   (2) a stabilizing effective amount of a copolymer of ethylene or propylene (A) and a vinyl compound (B) with the formula (I), produced by radical copolymerization of (A) and (B)

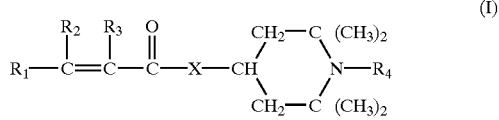

wherein
   X is O, NH or NR$_5$;
   R$_1$, R$_2$ and R$_3$ independently each are H, C$_1$–C$_8$ alkyl, C$_1$–C$_8$ alkenyl or C$_1$–C$_8$ substituted aryl;
   R$_4$ is H, C$_1$–C$_8$ alkyl, C$_6$–C$_{12}$ cycloalkyl, C$_1$–C$_{10}$ acyl, C$_1$–C$_{10}$ acyloxy or C$_1$–C$_8$ alkyl ether; and
   R$_5$ is C$_1$–C$_8$ alkyl;
wherein
   the copolymer comprises 1–4 mol % of (B), and
   the copolymer has an MFR$_2$ of 1–1000 g/10 min.

2. The stabilized polymer material of claim 1, wherein the polymer material (1) is selected from the group consisting of polyacrylate polymers, polyester polymers, polyamide polymers, polyurethanes, halogen containing polymers aromatic polymers and polycarbonate polymers.

3. The stabilized polymer material of claim 1, wherein the polymer material (1) is selected from the group consisting of propylene polymers, polymethyl(meth)acrylate polymers, polyethyleneterephthalate polymers, polyamide 6, polyamide 6/6, polyvinyl chloride, polyvinylidene chloride and polystyrene.

4. The stabilized polymer material of claim 1, wherein the polymer material (1) is a polyolefin.

5. The stabilized polymer material of claim 1, wherein the polymer material (1) is an ethylene polymer.

6. The stabilized polymer material of claim 1, wherein the copolymer comprises 1.5–4 mol % of (B).

7. The stabilized polymer material of claim 1, wherein the copolymer comprises 1.2–4 mol % of (B).

8. The stabilized polymer material of claim 1, wherein the MFR$_2$ is 10–400 g/10 min.

9. The stabilized polymer material of claim 1, wherein the amount of the copolymer is such that (B) comprises 0.01–0.80% by weight of the polymer material (1).

10. The stabilized polymer material of claim 1, wherein the amount of the copolymer is such that (B) comprises 0.05–0.60% by weight of the polymer material (1).

11. The stabilized polymer material of claim 1, wherein X is O; R$_1$, R$_2$ and R$_4$ are H and R$_3$ is CH$_3$.

12. The stabilized polymer material of claim 1, wherein the polymer material (1) is a C$_1$–C$_8$ olefin polymer.

13. The stabilized polymer material of claim 1, wherein the polymer material (1) is a homopolymer or a copolymer material.

14. The stabilized polymer material of claim 1, wherein the polymer material (1) is a low density polyethylene.

15. The stabilized polymer material of claim 1, wherein the polymer material (1) is a high density polyethylene.

16. A method of making the stabilized polymer material of claim 14, comprising combining (1) and (2).

* * * * *

UNITED STATES PATENT AND TRADEMARK OFFICE
CERTIFICATE OF CORRECTION

PATENT NO. : 6,887,939 B2
DATED : May 3, 2005
INVENTOR(S) : Udo Jegelka et al.

It is certified that error appears in the above-identified patent and that said Letters Patent is hereby corrected as shown below:

Title page,
Item [57], ABSTRACT,
Line 12, "$R_3$ are each independently H, $C_1$-$C_8$ alkyl, $C_1$-$C_8$ substituted aryl;" should read -- $R_3$ are each independently H, $C_1$-$C_8$ alkyl, $C_1$-$C_8$ alkenyl or substituted aryl; --.

Column 2,
Line 25, "1-1000 $\mu$1 0 min" should read -- 1-1000 g/10 min --;
Line 38, "$C_1$-$C_5$ alkyl" should read -- $C_1$-$C_8$ alkyl --.
Line 40, "compound ()" should read -- compound (B) --;
Line 49, "1.5 - 4 moil" should read -- 1.5 - 4 mol% --.

Column 3,
Line 3, "EP-A-0 468 418" should read -- EP-A-0 468 418 or transesterification of e.g. EMA
(ethylene/methyl acrylate copolymer) copolymers, e.g. as disclosed in EP-A-0 293 253 or US 4,413,096. --.

Signed and Sealed this

Nineteenth Day of July, 2005

JON W. DUDAS
*Director of the United States Patent and Trademark Office*